(12) United States Patent
Xu et al.

(10) Patent No.: US 11,101,767 B2
(45) Date of Patent: Aug. 24, 2021

(54) PHOTOVOLTAIC SUPPORT

(71) Applicant: GREE ELECTRIC APPLIANCES, INC. OF ZHUHAI, Guangdong (CN)

(72) Inventors: Dongyuan Xu, Guangdong (CN); Meng Huang, Guangdong (CN); Shugong Nan, Guangdong (CN); Xia Liu, Guangdong (CN); Wenqiang Tang, Guangdong (CN); Rongxin Liang, Guangdong (CN); Jianming Quan, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days.

(21) Appl. No.: 16/071,758

(22) PCT Filed: Jan. 20, 2017

(86) PCT No.: PCT/CN2017/071923
§ 371 (c)(1),
(2) Date: Jul. 20, 2018

(87) PCT Pub. No.: WO2017/125071
PCT Pub. Date: Jul. 27, 2017

(65) Prior Publication Data
US 2019/0036476 A1 Jan. 31, 2019

(30) Foreign Application Priority Data
Jan. 22, 2016 (CN) .......................... 201610046168.5

(51) Int. Cl.
*H02S 20/30* (2014.01)
*F24S 25/12* (2018.01)
(Continued)

(52) U.S. Cl.
CPC ......... *H02S 20/30* (2014.12); *F16M 11/2021* (2013.01); *F24S 25/12* (2018.05);
(Continued)

(58) Field of Classification Search
CPC ................ H02S 20/30; F16M 11/2021; F16M 2200/044; F16M 11/26; F16M 11/28;
(Continued)

(56) References Cited

U.S. PATENT DOCUMENTS 1,668,538 A * 5/1928 Brandt ...................... A47G 5/04
248/188.5
2,051,420 A * 8/1936 Renholdt ............. A47B 21/045
211/119.005
(Continued)

FOREIGN PATENT DOCUMENTS

CN 101431304 A 5/2009
CN 201601135 U 10/2010
(Continued)

OTHER PUBLICATIONS

International Search Report for International Application No. PCT/CN2017/071923 dated May 8, 2017, 3 pages.
(Continued)

*Primary Examiner* — Christopher Garft
(74) *Attorney, Agent, or Firm* — Armstrong Teasdale LLP

(57) ABSTRACT

A photovoltaic support includes a first vertical upright column (110) and a second vertical upright column (120) on a foundation, and a beam (10) respectively hinged with a first end of the first vertical upright column (110) and a first end of the second vertical upright column (120). The photovoltaic support further includes a first movable connecting piece (140) provided on the foundation and connected with a second end of the first vertical upright column (110). The first movable connecting piece (140) is automatically
(Continued)

adjusted according to the wind intensity, such that the first vertical upright column (110) moves in a vertical direction to adjust an inclination angle of the beam (130). The photovoltaic support can adjust the angle adaptively in the case of a strong wind, and restore automatically after the strong wind has passed.

3 Claims, 3 Drawing Sheets

(51) Int. Cl.
*F16M 11/20* (2006.01)
*F24S 25/00* (2018.01)
*F24S 50/60* (2018.01)
*F24S 40/00* (2018.01)
*F24S 30/00* (2018.01)

(52) U.S. Cl.
CPC ........ *F16M 2200/044* (2013.01); *F24S 40/00* (2018.05); *F24S 50/60* (2018.05); *F24S 2025/01* (2018.05); *F24S 2025/015* (2018.05); *F24S 2030/19* (2018.05)

(58) Field of Classification Search
CPC .... F16M 11/32; F24S 25/12; F24S 2025/015; F24S 50/60; F24S 2030/19
See application file for complete search history.

(56) References Cited

U.S. PATENT DOCUMENTS

| | | | | |
|---|---|---|---|---|
| 2,624,471 A * | 1/1953 | Lunde | ............. | B61G 11/18 213/221 |
| 3,827,663 A * | 8/1974 | Hinman | ............. | A47B 91/16 248/188.3 |
| 4,151,534 A * | 4/1979 | Bond | ............. | H01Q 1/1235 343/883 |
| 4,708,189 A * | 11/1987 | Ward | ............. | E04G 21/243 160/351 |
| 5,251,858 A * | 10/1993 | Ultee | ............. | A47B 91/16 248/188.3 |
| 5,657,958 A * | 8/1997 | McLaughlin | ............. | B62J 1/02 188/132 |
| 6,152,434 A * | 11/2000 | Gluck | ............. | E04F 21/1805 254/114 |
| 8,375,935 B2 * | 2/2013 | Chung | ............. | F24S 10/742 126/601 |
| 2002/0084389 A1 * | 7/2002 | Larson | ............. | A47B 13/003 248/188.1 |
| 2004/0178306 A1 * | 9/2004 | Hallberg | ............. | F16M 11/046 248/188.5 |
| 2008/0135694 A1 * | 6/2008 | Boyce | ............. | F16M 11/125 248/124.1 |
| 2011/0048406 A1 | 3/2011 | Hoffman et al. | | |
| 2011/0253214 A1 * | 10/2011 | Chung | ............. | F24S 30/452 136/259 |
| 2011/0297142 A1 | 12/2011 | Chung | | |
| 2012/0036800 A1 * | 2/2012 | Noglotte | ............. | H02S 20/20 52/173.3 |
| 2012/0285509 A1 | 11/2012 | Surganov | | |
| 2013/0305518 A1 * | 11/2013 | Adriani | ............. | H02S 20/00 29/592.1 |
| 2014/0083480 A1 | 3/2014 | Gerwing et al. | | |
| 2014/0158650 A1 | 6/2014 | Krantz et al. | | |
| 2017/0073204 A1 * | 3/2017 | Lageson | ............. | B66F 13/00 |
| 2017/0261130 A1 * | 9/2017 | Bernert | ............. | F16F 1/04 |

FOREIGN PATENT DOCUMENTS

| | | |
|---|---|---|
| CN | 101619896 A | 5/2011 |
| CN | 202042492 U | 11/2011 |
| CN | 203150574 U | 8/2013 |
| CN | 104132229 A | 11/2014 |
| CN | 104242800 A | 12/2014 |
| CN | 204271981 U | 4/2015 |
| CN | 204271983 U | 4/2015 |
| CN | 204156786 U | 11/2015 |
| CN | 204832966 U | 12/2015 |
| CN | 105245160 A | 1/2016 |
| CN | 105515507 A | 4/2016 |
| CN | 205545084 U | 8/2016 |
| DE | 202004001642 U1 | 5/2004 |
| JP | H0287679 A | 3/1990 |
| KR | 101552502 B1 | 9/2015 |
| WO | 2013171718 A2 | 11/2013 |
| WO | 2014162778 A1 | 10/2014 |

OTHER PUBLICATIONS

Supplementary European Search Report for EP 17741102.2, dated Aug. 16, 2019, 11 pages.

* cited by examiner

PHOTOVOLTAIC SUPPORT

The present application is the national stage entry of PCT/CN2017/071923, filed on Jan. 20, 2017, and entitled "Photovoltaic Support," which claims the benefit of priority to China Patent Application No. 201610046168.5, filed on Jan. 22, 2016 and entitled "Photovoltaic Support", the contents of which are hereby incorporated by reference in their entirety.

TECHNICAL FIELD

An embodiment of the disclosure relates to photovoltaic technology, and in particular to a photovoltaic support.

BACKGROUND

Along with the rapid development of new energy industries, solar energy is used as important basic energy in various renewable energy sources, and a solar power generation technology of the solar energy is a result of the rapid development of a photovoltaic industry. The photovoltaic support is a support in a solar photovoltaic generation system for supporting a solar panel, a fastening piece of the photovoltaic support can be adjusted to enable an inclined surface of the solar panel to adapt different angles of light, and the conversion efficiency of the solar energy is improved.

The related photovoltaic support includes an optimal inclination angle fixed-type photovoltaic support, a manual adjustment-type photovoltaic support and axis tracking-type photovoltaic supports including a horizontal single-axis tracking type, an inclined single-axis tracking type, a double-axis tracking type and so on. The fixed-type photovoltaic support is simple in structure and convenient to maintain, but the angle of a photovoltaic component cannot be adjusted according to an external environment in bad weather or strong wind, so the photovoltaic component is easily damaged. The manual adjustment-type photovoltaic support is limited by human factors, and cannot rapidly and accurately respond to disasters in time, the photovoltaic component is also easily damaged. Although the axis tracking-type photovoltaic supports can adjust the inclination angle of the photovoltaic component in time according to the external environment, the structure of the axis tracking-type photovoltaic supports is complicated, and the cost is high, the axis tracking-type photovoltaic supports are not convenient for the extensive application.

SUMMARY

An embodiment of the disclosure provides a photovoltaic support, to solve the problems in which a related photovoltaic support fails to automatically adjust the angle of a photovoltaic component according to an external environment and the cost of the photovoltaic support is high.

An embodiment of the disclosure provides a photovoltaic support, including a first vertical upright column and a second vertical upright column on a foundation, and a beam respectively hinged with a first end of the first vertical upright column and a first end of the second vertical upright column, further including:

a first movable connecting piece provided on the foundation and connected with a second end of the first vertical upright column, the first movable connecting piece is automatically adjusted according to the wind intensity, such that the first vertical upright column is moved in the vertical direction so as to adjust an inclination angle of the beam.

The photovoltaic support further includes:

a second movable connecting piece provided on the foundation and connected with a second end of the second vertical upright column, wherein the second movable connecting piece is automatically adjusted according to a wind intensity, such that the second vertical upright column moves in the vertical direction to adjust the inclination angle of the beam.

In an exemplary embodiment, the first movable connecting piece and the second movable connecting piece have a same structure, correspondingly, the movable connecting pieces each includes:

a spring housing fixed on the foundation, wherein an inner wall of the spring housing is provided with a limiting node, used for limiting a moving path of the corresponding upright column; and a spring provided in the spring housing, wherein a first end of the spring is fixedly connected with a bottom of the spring housing, and a second end of the spring is connected with a second end of the upright column, enabling the upright column to move in a vertical direction through a stretch out and draw back of an elastic force.

In an exemplary embodiment, the second end of the upright column is provided with a limiting block connected with the second end of the spring, and the limiting block is moved between the limiting node and a top of the spring housing through a stretch out and draw back of the spring so as to enable the upright column to move in the vertical direction.

In an exemplary embodiment, a limiting block of the first upright column contacts with a top of the spring housing of the first movable connecting piece in an initial position; and a limiting block of the second upright column contacts with a limiting node of a spring housing of the second movable connecting piece in the initial position.

In an exemplary embodiment, the photovoltaic support includes a hinging position of a first end of the second upright column and the beam is connected by a slide connecting piece, and the beam is moved in a horizontal direction through the slide connecting piece.

In an exemplary embodiment, the slide connecting piece includes: a sliding rail provided on the beam, a first hinging head provided in the sliding rail and a second hinging head provided on the first end of the second upright column and hinged with the first hinging head, wherein the first hinging head is moved in the sliding rail such that the beam is moved in a horizontal direction relative to the first hinging head.

In an exemplary embodiment, the first movable connecting piece includes: a housing fixed on the foundation, wherein the housing is provided with an inclined rail penetrated horizontally; correspondingly, the second end of the first upright column is provided with a roller, and the roller is provided in the inclined rail, and used for moving along the inclined rail according to the wind intensity such that the first upright column moves in the vertical direction so as to adjust the inclination angle of the beam.

The photovoltaic support provided by the embodiment of the disclosure includes a first movable connecting piece located on a foundation and connected with a second end of a first upright column, the first movable connecting piece can be automatically adjusted according to the wind intensity so as to enable the first upright column to move in a vertical direction, so the effect of adjusting the inclination angle of a beam is achieved. The photovoltaic support provided by the disclosure can adaptively adjust the angle in strong wind and automatically recover after the strong wind, simple in structure and easy to maintain, without the manual adjustment as well as a complicated electric control system, solving problems in which an existing photovoltaic support fails to automatically adjust the angle of a photovoltaic component and recover automatically and the cost of the photovoltaic support is high.

BRIEF DESCRIPTION OF THE DRAWINGS

In order to describe a technical scheme of the embodiments of the disclosure more clearly, the drawings required to be used in the embodiments of the disclosure will be simply introduced below. It is apparent that the drawings described below are only some embodiments of the disclosure. Other drawings may further be obtained by those skilled in the art according to these drawings without creative work.

DETAILED DESCRIPTION OF THE EMBODIMENTS

For making the purposes, technical schemes and advantages of the disclosure clearer, the technical schemes of the disclosure will further be clearly and completely described below in combination with the drawings in the embodiments of the disclosure in detail through the embodiments, it is apparent that the described embodiments are merely parts of the embodiments of the disclosure, rather than all of the embodiments. Based on the embodiments in the disclosure, all other embodiments obtained by those skilled in the art without creative work shall fall within the protection scope of the disclosure.

Figure 1A:
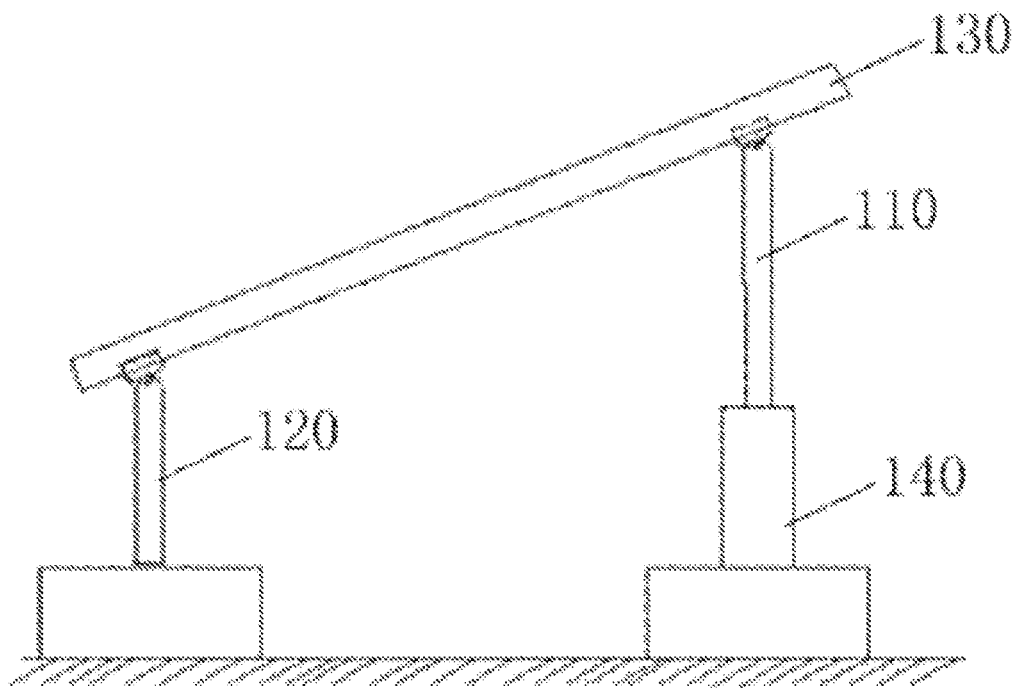
FIG. 1a is a sectional view of a first photovoltaic support provided by an embodiment 1 of the disclosure.

FIG. 1a is a sectional view of a photovoltaic support provided by an embodiment 1 of the disclosure, the embodiment is suitable for a circumstance of the adaptive adjustment of the photovoltaic support according to the wind intensity. In some embodiments, the photovoltaic support includes a first upright column 110 and a second upright column 120 on a foundation, and a beam 130 hinged with a first end of the first upright column 110 and a first end of the second upright column 120 respectively. In an exemplary embodiment, the photovoltaic support includes a first movable connecting piece 140 provided on the foundation and connected with a second end of the first upright column 110, the first movable connecting piece 140 is automatically adjusted according to the wind intensity, such that the first upright column 110 is moved in a vertical direction so as to adjust an inclination angle of the beam 130.

As the above, the photovoltaic support can be directly provided on the ground, roofs or other positions according to different using conditions. In an exemplary embodiment, the photovoltaic support is provided on the foundation. It should be noted that the beam 130 has an inclination angle in an initial installation of the photovoltaic support, and a hinging position of the first upright column 110 and the beam 130, and a hinging position of the second upright column 120 and the beam 130 have a rotation function. A whole photovoltaic system is supported by the first upright column 110 and the second upright column 120 of the photovoltaic support, the beam 130 is respectively hinged with the first upright column 110 and the second upright column 120, and a solar panel, namely a photovoltaic component, is carried on the photovoltaic support.

The first movable connecting piece 140 is respectively connected with the foundation and a second end of the first upright column 110, the second upright column 120 is connected with the foundation, the first movable connecting piece 140 is automatically adjusted according to the wind intensity so as to control the second end of the first upright column 110 to move in a vertical direction, such that an inclination angle of the beam 130 is changed. In an exemplary embodiment, the first movable connecting piece 140 has a movement critical value, while a wind intensity applied to the photovoltaic component is greater than the movement critical value of the first movable connecting piece 140, the first movable connecting piece 140 controls the first upright column 110 to move in the vertical direction under an action of force, while the wind intensity applied to the photovoltaic component is less than or equal to the movement critical value of the first movable connecting piece 140, the first movable connecting piece 140 controls the first upright column 110 to recover under the action of force.

In the case that the wind intensity is greater than the movement critical value of the first movable connecting piece 140, according to an external environment, wind directions can be sorted as a positive wind direction and a negative wind direction. While the wind direction is the positive wind direction, a stress is applied to a front face of the solar panel, namely a positive wind pressure is applied, a downward pressure is generated by the photovoltaic support, the second upright column 120 is fixed, the first movable connecting piece 140 controls the second end of the first upright column 110 to be downwards moved in the vertical direction under an action of the positive wind pressure, and the inclination angle of the beam 130 is reduced. While the wind direction is the negative wind direction, the stress is applied to a back face of the solar panel, namely a negative wind pressure is applied, at this moment, a large wind intensity is applied to a side, adjacent to the second upright column 120, of the beam 130, but the second upright column 120 cannot be stretched, based on a lever principle, the first movable connecting piece 140 controls the second end of the first upright column 110 to be downwards moved in the vertical direction under an action of the negative wind pressure, and the inclination angle of the beam 130 is reduced.

In an exemplary embodiment, if the wind intensity is less than or equal to the movement critical value of the first movable connecting piece 140, the first movable connecting piece 140 controls the second end of the first upright column 110 to be gradually moved and recover to the initial position.

While the inclination angle of the beam 130 is reduced, the solar panel has a tendency parallel to the wind direction, a wind pressure applied to the solar panel is reduced, so the solar panel is prevented from being damaged by typhoon or sudden strong wind. The inclination angle of the beam 130 is changed such that an angle of the photovoltaic component supported by the beam is changed, so the photovoltaic support can adaptively adjust the angle of the photovoltaic component according to the wind intensity and recover automatically. It should be understood by those skilled in the art that the first movable connecting piece 140 can be provided with a sliding rail or a spring for controlling the second end of the first upright column 110 to be moved in the vertical direction or other parts for moving the first upright column 110, or the first movable connecting piece 140 has a function of moving in the vertical direction, such as a mechanical seal, while the wind intensity is greater than a friction force or an elastic force of the first movable connecting piece 140, the first movable connecting piece 140 controls the first upright column 110 to be moved, and the cost of the first movable connecting piece 140 is low.

Figure 1B:
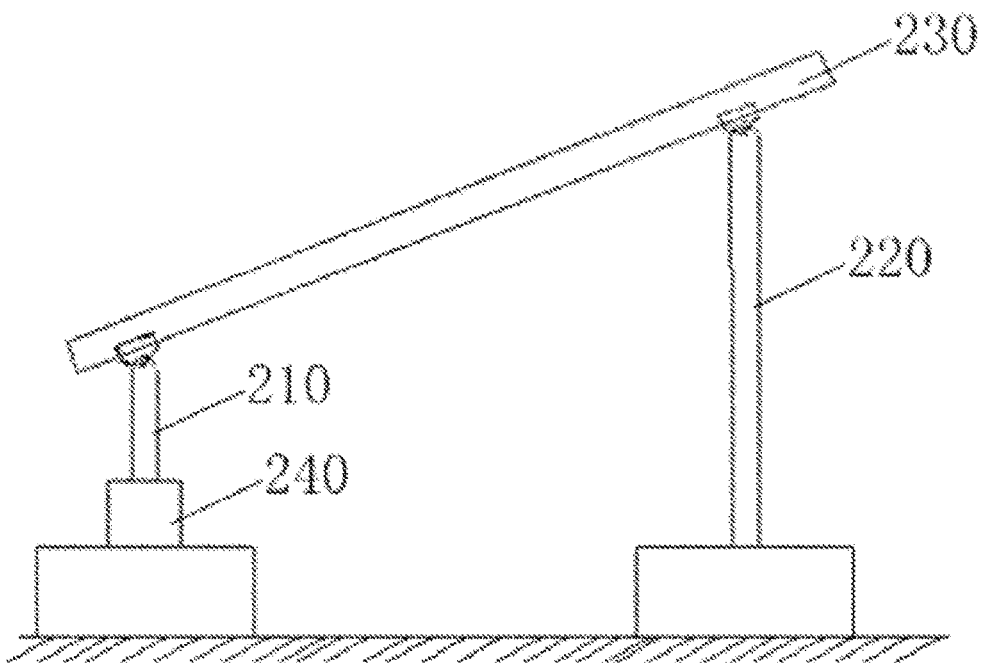
FIG. 1b is a sectional view of a second photovoltaic support provided by the embodiment 1 of the disclosure.

FIG. 1b is the sectional view of the second photovoltaic support provided by some embodiments of the disclosure, the embodiments can be suitable for the circumstance of the adaptive adjustment of the photovoltaic support according to the wind intensity. The photovoltaic support provided by the embodiments includes a first upright column 210 and a second upright column 220 on a foundation, and a beam 230 respectively hinged with a first end of the first upright column 210 and a first end of the second upright column 220, further including: a first movable connecting piece 240 located on the foundation and connected with a second end of the first upright column 210, the first movable connecting piece 240 is automatically adjusted according to the wind intensity, such that the first upright column 210 is moved in a vertical direction so as to adjust an inclination angle of the beam 230.

Specifically, in the case that the wind intensity is greater than a movement critical value of the first movable connecting piece 240, while a positive wind pressure is applied to the solar panel, the large wind intensity is applied to a side, adjacent to the second upright column 220, of the beam 230, but the second upright column 220 cannot be compressed, based on a similar lever principle, the beam 230 generates a force for stretching the first upright column 210, so the first movable connecting piece 240 controls the second end of the first upright column 210 to be upwards moved in the vertical direction under an action of the positive wind pressure, and the inclination angle of the beam 230 is reduced. While a negative wind pressure is applied to the solar panel, the second upright column 220 cannot be stretched, a drawing force is applied to the first upright column 210, so the first movable connecting piece 240 controls the second end of the first upright column 210 to be upwards moved in the vertical direction under an action of the negative wind pressure, and the inclination angle of the beam 230 is reduced. In the case that the wind intensity is less than or equal to the movement critical value of the first movable connecting piece 240, the first movable connecting piece 240 controls the second end of the first upright column 210 to be gradually moved and recover to the initial position.

The photovoltaic support provided by the embodiment 1 of the disclosure includes a first movable connecting piece 140 located on a foundation and connected with a second end of a first upright column 110, the first movable connecting piece 140 can be automatically adjusted according to the wind intensity so as to enable the first upright column 110 to move in a vertical direction, so the effect of adjusting the inclination angle of a beam 130 is achieved. The photovoltaic support provided by the disclosure not only can adaptively adjust the angle in strong wind, but also automatically recover after the strong wind, simple in structure and easy to maintain, without the manual adjustment as well as a complicated electric control system, solving problems in which a related photovoltaic support fails to automatically adjust the angle of a photovoltaic component and recover automatically and the cost of the photovoltaic support is high.

Figure 2:
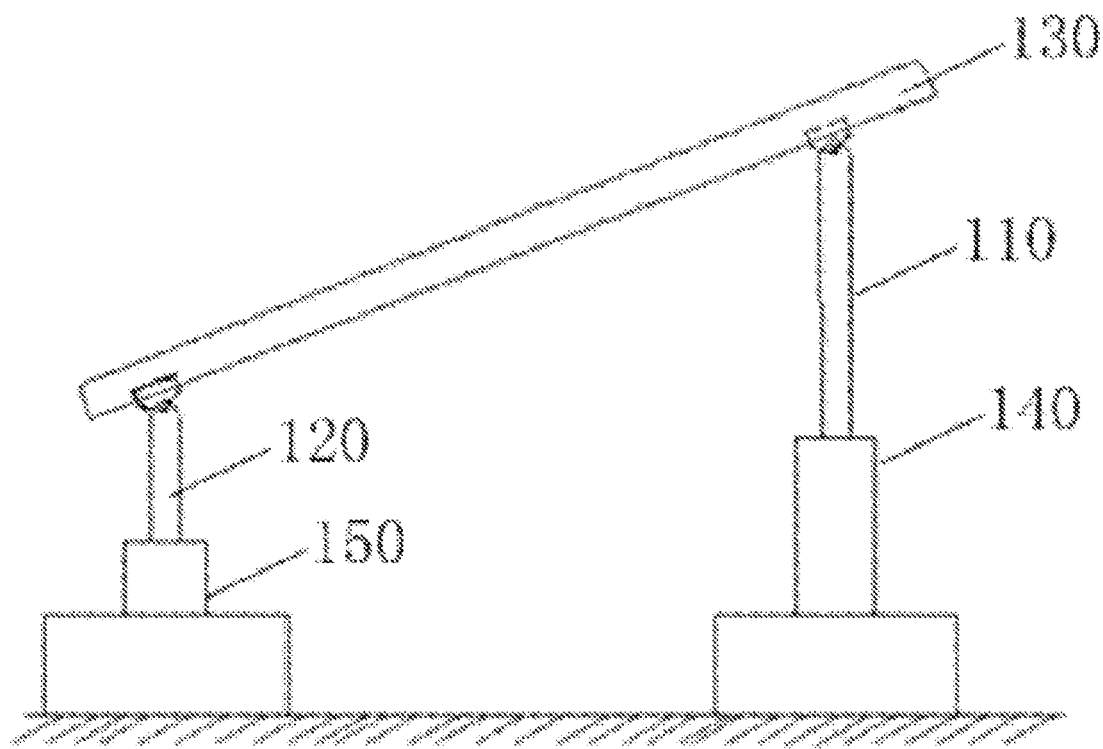
FIG. 2 is a sectional view of a photovoltaic support provided by an embodiment 2 of the disclosure.

In an exemplary implementation, the embodiment 2 of the disclosure provides a photovoltaic support, which can be suitable for a case of the adaptive adjustment of the photovoltaic support according to the wind intensity. The photovoltaic support as shown in FIG. 1a is used as an example and the drawing signs as shown in FIG. 1a are continuously used, the photovoltaic support provided by the embodiment as shown in FIG. 2 includes: a second movable connecting piece 150 located on a foundation and connected with a second end of a second upright column 120, the second movable connecting piece 150 is automatically adjusted according to the wind intensity, such that the second upright column 120 is moved in a vertical direction so as to adjust an inclination angle of a beam 130. The structure and the movement critical value of the first movable connecting piece 140 and the second movable connecting piece 150 are the same.

In the case that the wind intensity is greater than a movement critical value of the movable connecting piece, while the positive wind pressure is applied to the photovoltaic component, the first movable connecting piece 140 controls the second end of the first upright column 110 to be downwards moved in the vertical direction under an action of the positive wind pressure, the second movable connecting piece 150 controls the second end of the second upright column 120 to be upwards moved in the vertical direction under an action of a relative acting force and a wind pressure of the first movable connecting piece 140, and the inclination angle of the beam 130 is reduced. While the negative wind pressure is applied to the photovoltaic component, the second movable connecting piece 150 controls the second end of the second upright column 120 to be upwards moved in the vertical direction under an action of the negative wind pressure, the first movable connecting piece 140 controls the second end of the first upright column 110 to be downwards moved in the vertical direction under an action of a relative acting force and a wind pressure of the second movable connecting piece 150, and the inclination angle of the beam 130 is reduced.

Figure 3:
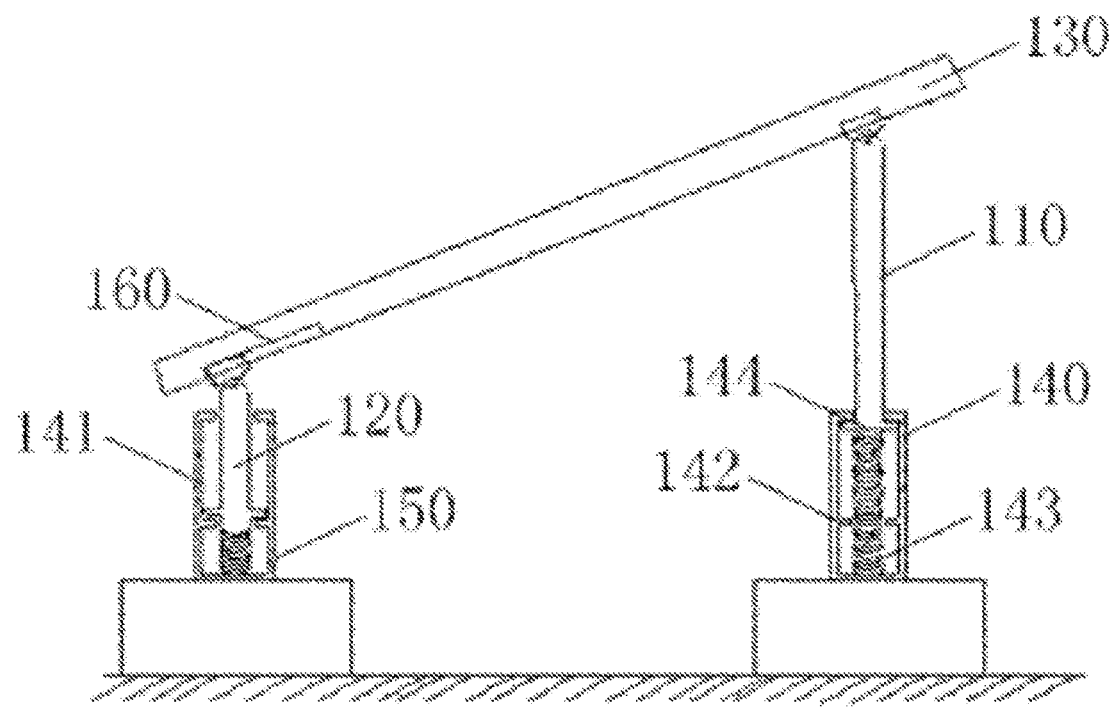
FIG. 3 is a sectional view of a photovoltaic support provided by an embodiment 3 of the disclosure.

On the basis of any above embodiments, the embodiment 3 of the disclosure provides a photovoltaic support, which can be suitable for a case of the adaptive adjustment of the photovoltaic support according to the wind intensity. The photovoltaic support as shown in FIG. 2 is used as an example and the drawing signs as shown in FIG. 2 are continuously used, the embodiment provides a photovoltaic support as shown in FIG. 3, wherein the structures of the first movable connecting piece 140 and the second movable connecting piece 150 are the same, the description is performed herein on the basis of the structure of any one movable connecting piece.

The movable connecting piece includes: a spring housing 141 fixed on a foundation, an inner wall of the spring housing 141 is provided with a limiting node 142, used for limiting a moving path of a corresponding upright column; a spring 143 provided in the spring housing 141, wherein a first end of the spring 143 is fixedly connected with a bottom of the spring housing 141, a second end of the spring 143 is connected with the second end of the upright column, used for moving the upright column in the vertical direction through an elastic force stretching. At this moment, the movable connecting piece is automatically adjusted according to the wind intensity, specifically, the spring 143 deforms according to the wind intensity such that the corresponding upright column is moved in the vertical direction, the movement critical value of the movable connecting piece is an elastic force critical value of the spring 143, while the wind intensity is greater than the elastic force critical value, the spring 143 in the movable connecting piece is deformed so as to move the corresponding upright column. In order to prevent the upright column from being moved in the horizontal direction within a large range, the limiting node 142 limits a moving distance in the horizontal direction and a moving path in the vertical direction of the upright column.

In an exemplary embodiment, the second end of the upright column is provided with a limiting block 144 connected with the second end of the spring 143, the limiting block 144 is moved between the limiting node 142 and a top of the spring housing 141 through a stretch out and draw back of the spring 143, such that the upright column is moved in the vertical direction. Specifically, while the wind intensity is small, the limiting block 144 of the first upright column 110 is capable of keeping the spring 143 corresponding to the first upright column 110 in a certain state, and the limiting block 144 of the second upright column 120 is capable of keeping the spring 143 corresponding to the second upright column 120 in a certain state, the spring 143 is kept unchanged. While the wind intensity is large, a force balance between the limiting block 144 and the spring 143 is broken by the positive wind pressure or the negative wind pressure on the photovoltaic component, the spring 143 is deformed such that the corresponding upright column is moved in the vertical direction.

In an exemplary embodiment, the limiting block 144 of the first upright column 110 contacts with the top of the spring housing 141 of the first movable connecting piece 140 in an initial position; and the limiting block 144 of the second upright column 120 contacts with the limiting node 142 of the spring housing 141 of the second movable connecting piece 150 in the initial position. The beam 130 of the photovoltaic support should keep a certain inclination angle in an initial state, and the inclination angle is an initial installation angle of the photovoltaic support preferably.

For the photovoltaic support as shown in FIG. 3, a working principle of the photovoltaic support is that while the positive wind pressure is applied to the photovoltaic component on the photovoltaic support, a force is applied to a front face of the photovoltaic component, and a tendency for compressing the springs 143 corresponding to each of the first upright column 110 and the second upright column 120 is generated. Because the limiting block 144 of the second upright column 120 is located at an exterior of the limiting node 142, such that the corresponding spring 143 cannot be compressed, only the spring 143 corresponding to the first upright column 110 is compressed, correspondingly, the inclination angle of the photovoltaic component is reduced, a plane of the photovoltaic component has a tendency parallel to the wind direction, the stress condition of the front face of the photovoltaic component is effectively reduced, and the photovoltaic component is prevented from being damaged by the typhoon or sudden strong wind. While the wind intensity is reduced, the spring 143 of the first upright column 110 is recovered such that the photovoltaic component is recovered to the inclination angle before the wind.

While the negative wind pressure is applied to the photovoltaic component, a force is applied to a back plate of the photovoltaic component, a tendency for stretching the springs 143 corresponding to each of the first upright column 110 and the second upright column 120 is generated. Because the limiting block 144 of the first upright column 110 contacts with the top of the spring housing 141, the spring 143 of the first upright column 110 cannot be stretched under a limitation of the spring housing 141 of the first upright column 110 and the limiting block 144. At this moment, only the spring 143 of the second upright column 120 is stretched, an inclination angle of the corresponding photovoltaic component is reduced, so the plane of the photovoltaic component has a tendency parallel to the wind direction, a pressure of the windward side of the photovoltaic component is effectively reduced, and the photovoltaic component is prevented from being damaged by the strong wind. After the wind intensity is reduced, the spring 143 of the second upright column 120 is automatically recovered such that the photovoltaic component is returned to the corresponding inclination angle.

It should be noted that the beam 130 is respectively hinged with the first upright column 110 and the second upright column 120, while the first upright column 110 is moved in the vertical direction, a lateral displacement between the second upright column 120 and the beam 130 is generated because of a change of the inclination angle of the beam 130, in some embodiments, a hinging position of the first end of the second upright column 120 and the beam 130 is connected by a slide connecting piece 160, the beam 130 is moved in the horizontal direction through the slide connecting piece 160. While the inclination angle of the beam 130 is increased or reduced, the beam 130 is moved in the horizontal direction through the slide connecting piece 160, such that the second upright column 120 cannot be moved in the horizontal direction, and the stability of the photovoltaic support is improved.

In an exemplary embodiment, the slide connecting piece 160 includes: a slide rail provided on the beam 130, a first hinging head located in the slide rail, and a second hinging head provided at the first end of the second upright column 120 and hinged with the first hinging head, the first hinging head is moved in the slide rail such that the beam 130 is moved in the horizontal direction relative to the first hinging head. It should be understood by those skilled in the art that the slide connecting piece 160 can also be other forms, and no longer elaborated herein.

The photovoltaic support provided by the some embodiments is capable of, in the case of typhoon or sudden strong wind, according to the different windward faces of the photovoltaic component, and through the automatic stretching of a spring structure, automatically adjusting the angle of the photovoltaic component by adapting the wind intensity, and automatically recovering to the corresponding angle after the strong wind, without a complicated electric control system and manual adjustment, simple in structure and easy to maintain, and solving problems in which a related photovoltaic support fails to automatically adjust the angle of a photovoltaic component and recover automatically, and improving the anti-wind capability of a photovoltaic support system.

Figure 4:
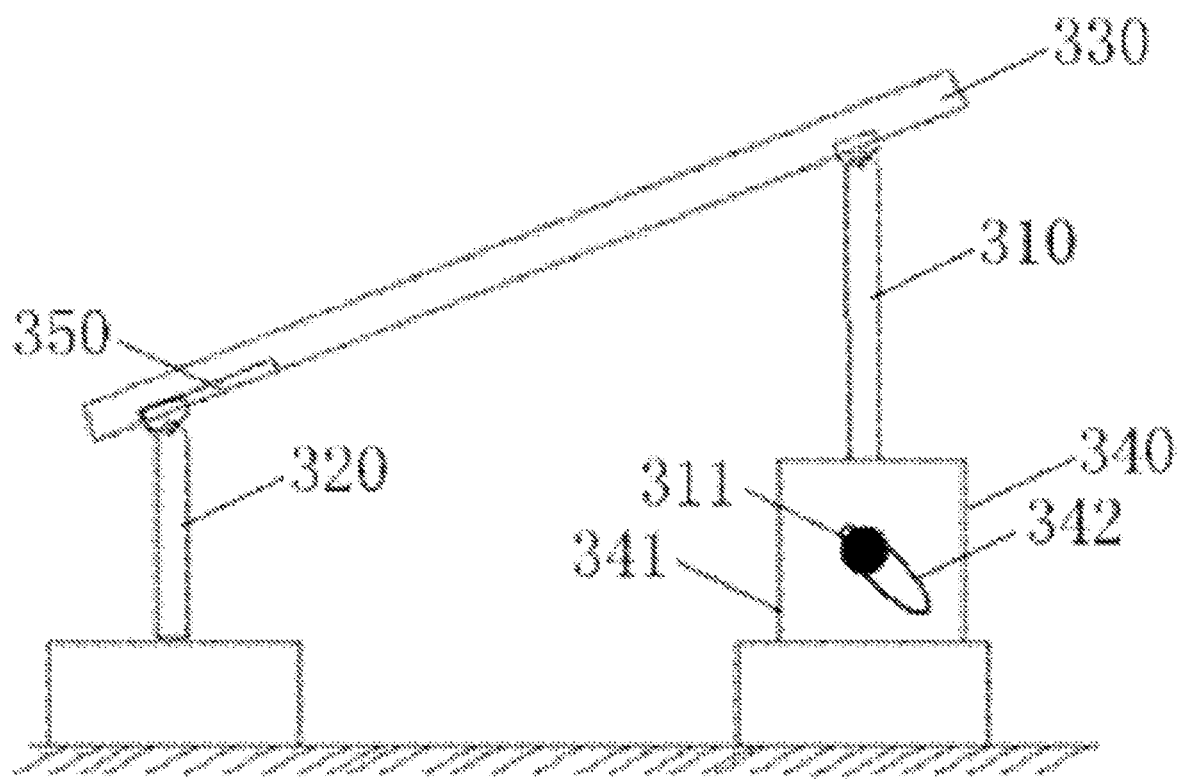
FIG. 4 is a sectional view of a photovoltaic support provided by an embodiment 4 of the disclosure.

The embodiment 4 of the disclosure further provides a photovoltaic support, which can be suitable for the case of the adaptive adjustment of the photovoltaic support according to the wind intensity. As shown in FIG. 4, the difference between the photovoltaic support and the above embodiments is that the first movable connecting piece includes a housing 341 fixed on a foundation, wherein the housing 341 is provided with a horizontal through inclined rail 342; correspondingly, the second end of the first upright column 310 is provided with a roller 311, and the roller 311 is provided in the inclined rail 342, and used for moving along the inclined rail 342 according to the wind intensity such that the first upright column 310 moves in a vertical direction so as to adjust the inclination angle of the beam 330, wherein a hinging position of the first end of the second upright column 320 and the beam 330 is connected with a slide connecting piece 350, and the beam 330 is moved in the horizontal direction through the slide connecting piece 350.

As the above, the roller 311 of the first upright column 310 is located at a top of the inclined rail 342 in the initial position. In the case of large wind intensity, while the wind direction is the positive wind direction, a force is applied to a front face of the solar panel, namely the positive wind pressure is applied, a pressure for compressing the upright column is generated by the photovoltaic support, the second upright column 320 is fixed, the second end of the first upright column 310 is downwards moved in the vertical direction, namely the first upright column 310 is downwards moved along the inclined rail 342, the beam 330 is moved in the horizontal direction through the slide connecting piece 350, and the inclination angle of the beam 330 is reduced.

While the wind direction is the negative wind direction, a force is applied to a back face of the solar panel, namely the negative wind pressure is applied, at this moment, the large wind intensity is applied to a side, adjacent to the second upright column 320, of the beam 330, but the second upright column 320 cannot be compressed, the second end of the first upright column 310 is downwards moved in the vertical direction, and the inclination angle of the beam 330 is reduced.

The photovoltaic support provided by the embodiment is capable of, in the case of typhoon or sudden strong wind, according to the different windward faces of the photovoltaic component, and through the automatic displacement of a upright column roller structure, automatically adjusting the angle of the photovoltaic component by adapting the wind intensity, simple in structure and easy to maintain, and solving problems in which an existing photovoltaic support fails to automatically adjust the angle of a photovoltaic component, and improving the anti-wind capability of a photovoltaic support system.

It should be noted that the above are merely the better embodiments and the used technical principles of the disclosure. It should be understood by those skilled in the art that the disclosure is not limited to the specific embodiments herein, and various apparent changes, readjustments and replacements can be performed by those skilled in the art without departing from the protection scope of the disclosure. Although, the disclosure is described in detail through the above embodiments, the disclosure is not merely limited to the above embodiments, and further includes more other equivalent embodiments in the case without departing from the concept of the disclosure, and the scope of the disclosure is determined by the scope of the attached claims.

What is claimed is:

1. A photovoltaic support, comprising a first upright column and a second upright column on a foundation, and a beam respectively hinged with a first end of the first upright column and a first end of the second upright column, wherein the photovoltaic support further comprises:
   a first movable connecting piece provided on the foundation and connected with a second end of the first upright column, wherein the first upright column is automatically adjusted according to wind intensity, such that the first upright column is moved in a vertical direction so as to adjust an inclination angle of the beam;
   a second movable connecting piece provided on the foundation and connected with a second end of the second upright column, wherein the second upright column is automatically adjusted according to a wind intensity, such that the second upright column is moved in the vertical direction so as to adjust the inclination angle of the beam;
   wherein the first movable connecting piece comprises: a spring housing fixed on the foundation, wherein an inner wall of the spring housing is provided with a limiting node used for limiting a moving path of the first upright column; and a spring provided in the spring housing, wherein a first end of the spring is fixedly connected with a bottom of the spring housing, and a second end of the spring is connected with a second end of the first upright column, enabling the first upright column to be moved in a vertical direction through a compression of the spring;
   wherein the second end of the first upright column is provided with a limiting block connected with the second end of the spring, and the limiting block is moved between the limiting node and a top of the spring housing through a stretch out and draw back of the spring so as to enable the first upright column to move in the vertical direction;
   the limiting block of the first upright column contacts with the top of the spring housing of the first movable connecting piece in an initial position, so that the spring of the first upright column cannot be stretched under a limitation of the spring housing of the first upright column and the limiting block; the beam has an inclination angle in an initial installation of the photovoltaic support;
   wherein the first movable connecting piece and the second movable connecting piece have a same structure; correspondingly, the second movable connecting piece comprises:
   a spring housing fixed on the foundation, wherein an inner wall of the spring housing is provided with a limiting node used for limiting a moving path of the second upright column; and
   a spring provided in the spring housing, wherein a first end of the spring is fixedly connected with a bottom of the spring housing, and a second end of the spring is connected with a second end of the second upright column, enabling the second upright column to be moved in a vertical direction through a stretch out and draw back of an elastic force;
   wherein the second end of the second upright column is provided with a limiting block connected with the second end of the spring, and the limiting block is moved between the limiting node and a top of the spring housing through a stretch out and draw back of the spring so as to enable the second upright column to move in the vertical direction;
   the limiting block of the second upright column contacts with a limiting node of the spring housing of the second movable connecting piece in an initial position, so that a corresponding spring cannot be compressed.

2. The photovoltaic support as claimed in claim 1, further comprising:
   a slide connecting piece, wherein a hinging position of a first end of the second upright column and the beam is connected by the slide connecting piece, and the beam is moved in a horizontal direction through the slide connecting piece.

3. The photovoltaic support as claimed in claim 2, wherein the slide connecting piece comprises: a slide rail provided on the beam, a first hinging head provided in the slide rail, and a second hinging head provided at the first end of the second upright column and hinged with the first hinging head, wherein the first hinging head is moved in the slide rail such that the beam is moved in the horizontal direction relative to the first hinging head.

* * * * *